United States Patent [19]

Morey et al.

[11] Patent Number: 5,042,898

[45] Date of Patent: Aug. 27, 1991

[54] INCORPORATED BRAGG FILTER TEMPERATURE COMPENSATED OPTICAL WAVEGUIDE DEVICE

[75] Inventors: William W. Morey, West Hartford; Walter L. Glomb, Ellington, both of Conn.

[73] Assignee: United Technologies Corporation, Hartford, Conn.

[21] Appl. No.: 456,440

[22] Filed: Dec. 26, 1989

[51] Int. Cl.$^5$ .............................................. G02B 6/34
[52] U.S. Cl. ...................................................... 385/37
[58] Field of Search ................ 350/96.19, 96.13, 96.30

[56] References Cited

U.S. PATENT DOCUMENTS 4,725,110  2/1988  Glenn et al. ........................ 350/3.61

Primary Examiner—William L. Sikes
Assistant Examiner—Robert E. Wise
Attorney, Agent, or Firm—Peter R. Ruzek

[57] ABSTRACT

A temperature compensated embedded grating optical waveguide light filtering device includes an optical fiber having an elongated core in which light is guided toward a core portion of a predetermined limited length that has embedded therein a multitude of grating elements extending with a substantially equal longitudinal spacing substantially normal to the longitudinal axis and collectively constituting a grating that reflects, of the light propagating in the path toward and reaching the grating elements, that of a wavelength within a narrow range about a central wavelength determined by the spacing of the grating elements and by the index of refraction of the material of the core as influenced by the temperature of and longitudinal strains applied to the grating, back into the path for longitudinal propagation therein opposite to the original propagation direction. Each end of the fiber portion is attached to a different one of two compensating members made of materials with such coefficients of thermal expansion relative to one another and to that of the fiber material as to apply to the fiber longitudinal strains the magnitude of which varies with temperature in such a manner that the changes in the central wavelength that are attributable to the changes in the longitudinal strains substantially compensate for those attributable to the changes in the temperature of the grating.

3 Claims, 2 Drawing Sheets

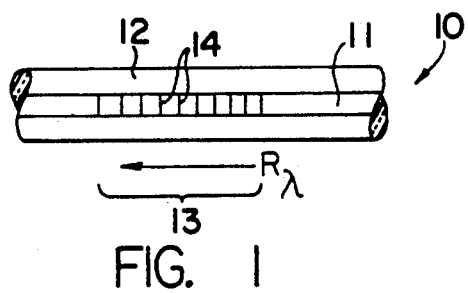
FIG. 1
FIG. 2
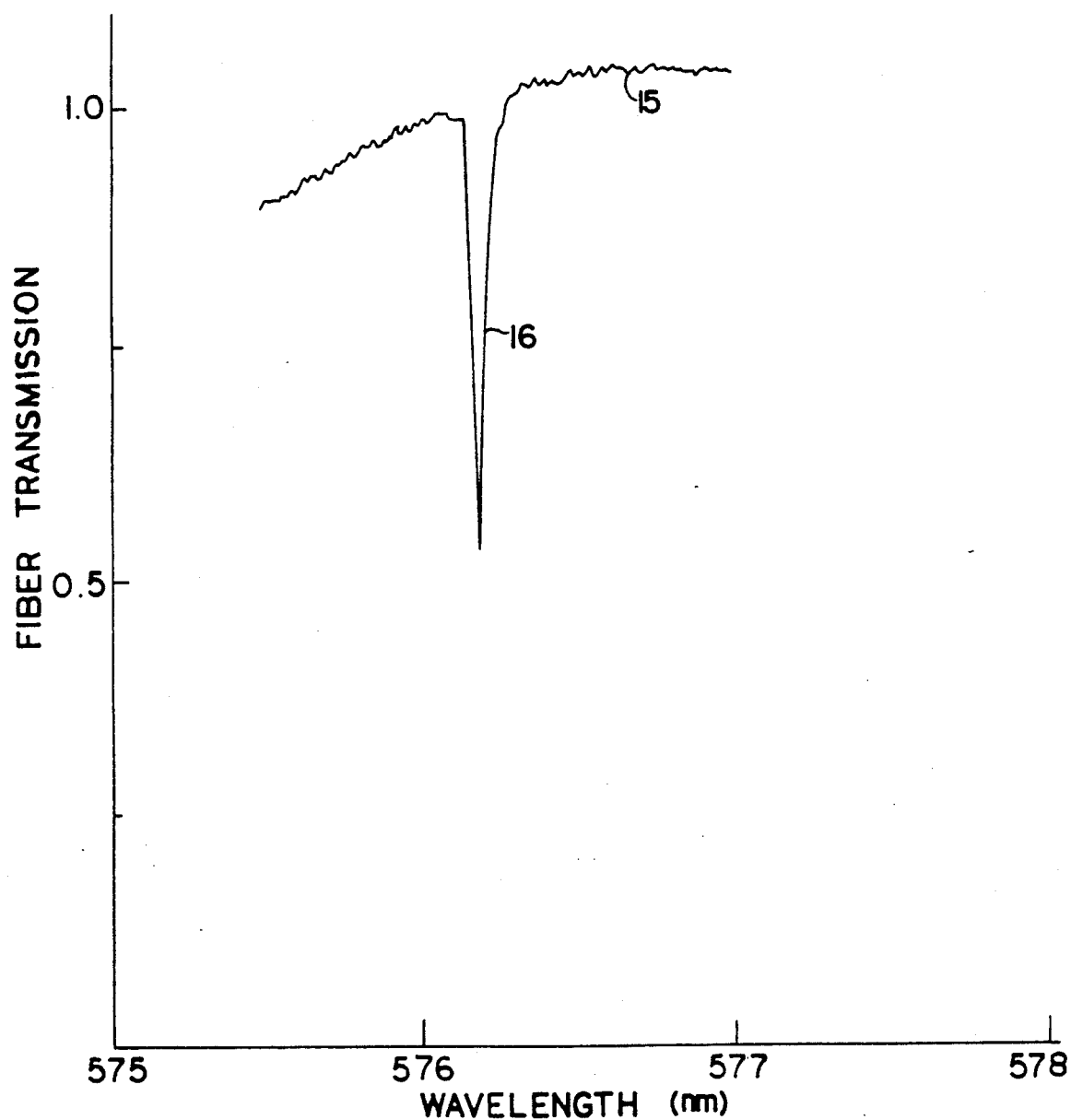

INCORPORATED BRAGG FILTER TEMPERATURE COMPENSATED OPTICAL WAVEGUIDE DEVICE

DESCRIPTION

1. Technical Field

The present invention relates to optical filters in general, and more particularly to improved accuracy filtering devices including Bragg filters incorporated in optical waveguides, especially in optical fibers.

2. Background Art

There are already known various constructions of optical filters, among them such which utilize the Bragg effect for wavelength selective filtering. The commonly owned U.S. Pat. No. 4,725,110, issued on Feb. 16, 1988, discloses an example of a method for incorporating an optical filter of this type in an optical fiber. This method involves imprinting at least one periodic grating in the core of the optical fiber by exposing the core through the cladding to the interference pattern of two ultraviolet beams that are directed against the optical fiber at two angles relative to the fiber axis that complement each other to 180°. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is substantially transparent to light at wavelengths outside the aforementioned narrow band so that it does not affect the further propagation of such other light. The incorporated periodic grating of this kind thus produces a narrow transmission notch and a commensurately narrow reflection peak in the spectrum of the light propagating in the optical fiber in one or the other of its longitudinal directions. The frequency of the light affected in this manner by the incorporated periodic grating is related to the periodicity of the grating in a manner explained in the above patent.

The optical fiber with the incorporated grating filter obtained in the above manner is well suited for use as a strain or temperature sensor because the frequency of the light reflected by the grating varies either with the strain to which the grating region is subjected, or with the temperature of the grating region, in a clearly defined relationship, which is substantially linear at least within the range of interest, to either one of these parameters. It is also possible to employ this kind of a sensor in an environment where both the strain of the grating region due to external forces imposed on the fiber, and the temperature of the grating region, vary with time in a manner that is not necessarily concurrent, and to separately evaluate the reflected wavelength changes attributable to the grating region strain, on the one hand, and the grating region temperature, on the other hand, in a manner that is also discussed in the above patent.

As advantageous as the incorporated optical core grating filter of the above type is for use in the above and similar applications, there are other applications which would greatly benefit from the use of such a filter but for which the above filter is not suited in its basic form disclosed in the above patent, for the very reason that enables it to serve as a temperature sensor, that is, the temperature dependency of the wavelength of the light reflected thereby. Inasmuch as the frequency of the light reflected by such optical filter varies with the temperature of the grating region, this basic filter cannot be used in applications where the reflected light frequency is to be independent of temperature. This precludes the use of the basic filter as a frequency standard and in similar applications. Obviously, this is very disadvantageous inasmuch as it severely limits the field of use of the incorporated optical fiber filter.

Accordingly, it is a general object of the present invention to avoid the disadvantages of the prior art.

More particularly, it is an object of the present invention to provide a wavelength selective optical filter device which does not possess the disadvantages of the known filter devices of this kind.

Still another object of the present invention is so to develop the filter device of the type here under consideration as to substantially eliminate the influence of temperature changes on the filter wavelength.

It is yet another object of the present invention to devise a device of the above type which maintains its operation at a selected wavelength, or which can be tuned to different wavelengths, without the ambient temperature affecting the result.

A concomitant object of the present invention is to design the device of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a temperature compensated embedded grating optical waveguide light filtering device which includes an optical waveguide including an elongated core having two longitudinally spaced end portions, and means for guiding light in an elongated path along a longitudinal axis of the core. The core includes a portion of a predetermined limited length at a location remote from its end portions and has embedded therein a multitude of grating elements extending with a substantially equal longitudinal spacing substantially normal to the longitudinal axis and collectively constituting a grating that reflects, of the light propagating in the path toward and reaching the grating elements, that of a wavelength within a narrow range about a central wavelength determined by the spacing of the grating elements and by the index of refraction of the material of the core as influenced by the temperature of and longitudinal strains applied to the grating, back into the path for longitudinal propagation therein opposite to the original propagation direction. According to the invention, the device further includes means for applying to the fiber longitudinal strains the magnitude of which varies with temperature in such a manner that the changes in the central wavelength that are attributable to the changes in the longitudinal strains substantially compensate for those attributable to the changes in the temperature of the grating.

BRIEF DESCRIPTION OF THE DRAWING

The present invention will be described in more detail below with reference to the accompanying drawing in which:

FIG. 1 is an axial sectional view of an optical fiber having a wavelength selective grating region embedded in its core;

FIG. 2 is a graphic representation of the dependency of transmissivity of the grating region of the optical fiber of FIG. 1 on wavelength under selected temperature and strain conditions;

BEST MODE FOR CARRYING OUT THE INVENTION

Figure 3:
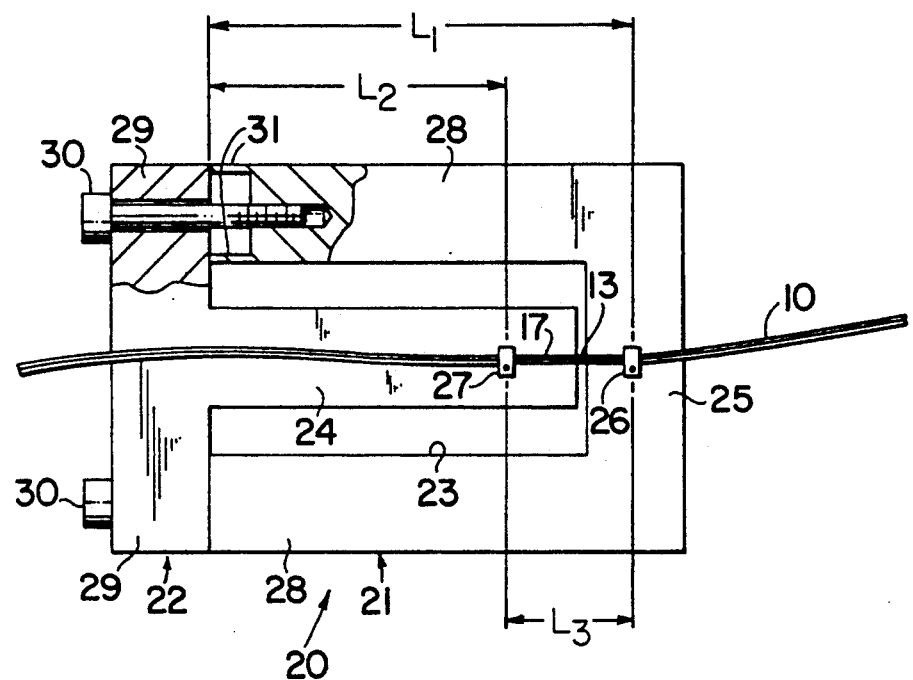
FIG. 3 is a partially sectioned side elevational view of a temperature compensated filter device of the present invention which includes, in addition to the optical fiber of FIG. 1, two compensating members that cooperate with one another and with the fiber in such a manner that tensile stresses applied thereby to the fiber cause the wavelength at which the grating region is reflective to be substantially independent of temperature.

Referring now to the drawing in detail, and first to FIG. 1 thereof, it may be seen that the reference numeral 10 has been used therein to identify an optical waveguide. The waveguide 10 is shown to be configured as an optical fiber of which only a relatively short longitudinal portion is depicted and which includes a fiber core 11 and a fiber cladding 12 surrounding the fiber core 11. The fiber core 11 incorporates a grating region 13 that includes a multitude of grating elements 14 each extending substantially normal to the longitudinal axis of the core 11. The grating elements 14 are equidistantly spaced from one another as considered in the longitudinal direction of the optical fiber 10.

The grating elements 14 are advantageously formed in the core 11 by the method disclosed in the aforementioned U.S. Pat. No. 4,725,110 the disclosure of which is incorporated herein by reference to the extent needed for understanding how the grating elements 14 of the optical waveguide of the present invention can be produced in the core 11. When the grating region 13 is produced in this manner, consecutive ones of the grating elements 14 are present at the same periodic spacings throughout the grating region 13 but not in regions of the fiber core 11 that longitudinally adjoin the respective ends of the grating region 14. While only a minuscule portion of the light propagating through the fiber core 11 is reflected back to the point of origin at each of the grating elements 14 as a result of the refractive index changes attributable to the presence of the grating elements 14, the cumulative effect of the grating elements 14 is the reflection of a significant proportion of the light the wavelength of which is in a very narrow range around a center wavelength $\lambda$ that is in a predetermined ratio to the periodicity of the grating elements 14, as indicated by an arrow $R_\lambda$ in FIG. 1.

The effect of this wavelength selective reflection is illustrated in FIG. 2 which is a plot of the fiber transmission versus wavelength for an incorporated grating optical fiber 10 with a certain grating element periodicity, under certain conditions of use. It may be seen there that a transmissivity curve 15 has a pronounced narrow notch or stopband 16 at about $\lambda = 576.2$ nanometers. Experience with this type of fiber has shown that the light so removed from the transmissivity spectrum is in fact reflected back to the point of origin.

It has also been established that the wavelength $\lambda$ changes with temperature, on the one hand, and with optical fiber strain, on the other hand. So, for instance, as far as the temperature dependency is concerned, a frequency shift of approximately 5.37 GHz/°C. has been measured when using optical fiber incorporated grating region 13 the spacing of the grating elements 14 of which is selected to have the stopband 16 at an operating wavelength of about 580 nm. On the other hand, the Bragg filter frequency is dependent on the length change and the attendant strain optic effect when the grating region 13 is subjected to tension or compression; so, for instance, measurements made on Bragg gratings subjected to tension have given frequency shifts of approximately 40.1 GHz/psi or 0.418 GHz/microstrain.

The present invention is based on the concept of using the frequency changes or shifts attributable to changing optical grating strains to counteract and/or eliminate the frequency shifts attributable to variations in the optical grating temperature. One way of accomplishing this objective is illustrated in FIG. 3 of the drawing in which the same reference numerals as before have been used to identify corresponding parts. A fiber optic filter device 20 of the present invention is shown to include as its main components, in addition to a portion 17 of the optical fiber 10 that includes the embedded grating 13, a first compensating member 21 and a second compensating member 22. The first compensating member 21 has a central recess 23 and the compensating member 22 includes a central projection 24 extending into the recess 23 and terminating short of the bottom of the latter. The optical fiber 10 is connected, at the respective ends of the fiber portion 17, to a bridge portion 25 of the compensating member 21 and to the projection 24 of the compensating member 22, respectively, by respective connecting members 26 and 27. The connecting members 26 and 27 may be of the mechanical type, such as clamps or the like, or they may be constituted by respective bodies, layers or pads of adhesive, solder, or the like. In this configuration the fiber 10 is advantageously either coated with a metal or ceramic protective buffer or bonded inside a small tube made of, for instance, silica. In any event, the connecting members 26 and 27 define the length ($L_3$) of the fiber section 17 that spans the distance between the attachment points of the optical fiber 10 to the compensating members 21 and 22 and rigidly connect the fiber section 17 with the compensating members 21 and 22.

The compensating members 21 and 22 further have respective cooperating portions 28 and 29 which are rigidly connected to or integral with the bridging portion 25 and with the projection 26, respectively, and are juxtaposed with one another in the assembled condition of the device 20. The compensating members 21 and 22 are connected with one another by respective preloading members 30, such as, as illustrated, screws with fine pitch threads which pass through respective unthreaded bores in the portions 29 and are threaded into corresponding threaded bores of the portions 28. In the illustrated construction of the device 20, one of the portions 28 of the compensating member 21 is shown to be provided, at its region that is juxtaposed with the corresponding portion 29 of the compensating member 22, with integral spring contacts 31 that are in contact with the portion 29 in the operating condition of the device 20. As the preloading members 30 are tightened, the spring contacts 31 are caused to resiliently yield with the result that the forces exerted on the compensating member 22 by the preloading members 30 and by the optical fiber 10, on the one hand, and by the spring contacts 31, on the other hand, establish an equilibrium, and thus hold the compensating member 22 in any selected position in an operating range with respect to the compensating member 21. It may be seen that, inasmuch as the fiber attachment points constituted by the connecting members 26 and 27 are spaced from a contact plane between the compensating members 21 and 22 by respective distances $L_1$ and $L_2$ and the distance $L_3$ is the difference between the distances $L_1$ and $L_2$, it is possible to change the distance $L_3$ by simply tightening or loosening the preloading members 30. This means that the section 17 of the optical fiber 10 can be subjected to tensile preloading stresses simply by first tightening the preloading members 30 to the extent needed for the compensating member 22 to reach its position at the end of the desired operating range relative to the compensating member 21, followed by connecting the optical fiber 10 in a substantially taut condition between the aforementioned attachment points to the compensating members 21 and 22 by means of the connecting members 26 and 27, and then by loosening the preloading members 30 to the extent needed for the grating region 13 to be reflective to light in the narrow range around the desired wavelength $\lambda$.

During the subsequent use of the device 20 following the preloading of the fiber portion 17 containing the Bragg filter grating region 13, the effect of differential thermal expansions between the materials of the compensating members 21 and 22 is being used to partially relieve the tension applied to the fiber portion 17 with a temperature increase (and vice versa on a temperature decrease), to thus balance out or compensate the change in the frequency of the filter 13 with the changing temperature. The rate of relieving tension can be chosen in such a manner, by choosing materials with appropriate thermal expansion coefficients for the compensating members 21 and 22 and by adjusting the geometry, as to hold the frequency of the Bragg filter 13 constant. In the device 20 illustrated in FIG. 3 of the drawing, the material of the compensating member 22 has a larger temperature coefficient of expansion than the material of the compensating member 21. As a consequence, the tensile stress of the fiber portion 17 containing the filter or grating region 13 will be relieved on a temperature increase and increased on a temperature drop. In this case the attached fiber portion 17 is preloaded in tension with a mechanical adjustment at the junction between the two compensating members 21 and 22. In fact, the mechanical tension adjustment could be used to set or tune the filter 13 to any desired or standard frequency.

The material expansion constants and lengths required to cancel the temperature effect can be calculated as follows:

The free space Bragg wavelength is given by:

$$\lambda = 2n\Lambda$$

where n is the refractive index of the fiber core 11 and $\Lambda$ is the spacing of the Bragg grating filter elements 14. The change in Bragg wavelength for a temperature change $\Delta T$ from ambient is then given by $$\Delta\lambda/\lambda = (\alpha_f + \zeta)\Delta T + (1-p_e)\Delta\epsilon$$

where $\alpha_f$ is the thermal expansion coefficient of the fiber 10, $\Delta\epsilon$ is the change in the strain with $\Delta T$, $\zeta$ is the thermooptic coefficient for the fiber material, and $p_e$ the photoelastic constant. These last two quantities are related to the change in index by $$\zeta = \frac{1}{n}\frac{dn}{dT}; p_e = -\frac{1}{n}\frac{dn}{d\epsilon} = .22$$

Referring once more to FIG. 3, the change in length of the filter portion 17 is given by $$\Delta\epsilon L_3 = (\alpha_1 L_1 - \alpha_2 L_2 - \alpha_f L_3)\Delta T$$

where $\alpha_1 L_1$ and $\alpha_2 L_2$ correspond to the length changes of the materials in the reentrant cavity design. The normalized wavelength change per unit temperature change is given in terms of the length changes by the expression $$\Delta\lambda/\lambda\Delta T = \alpha_f + \zeta + (1-p_e)\{\alpha_1 L_1/L_3 - \alpha_2 L_2/L_3 - \alpha_f\}$$

To null out the temperature effects, the material constants and lengths $\alpha_1, L_1, \alpha_2, L_2$ are to be chosen so that $\Delta\lambda/\lambda\Delta T = 0$. Then, $$\alpha_f p_e + \zeta + (1-p_e)(\alpha_1 L_1 - \alpha_2 L_2)/L_3 = 0$$

or $$(\alpha_2 L_2 - \alpha_1 L_1)/L_3 = (\alpha_f p_e + \zeta)/(1-p_e)$$

For example, with the known constants $\alpha_f = 0.55 \times 10^{-6}/°C.$, $p_e = 0.22$, $\zeta = 8.31 \times 10^{-6}/°C.$ we have $$(\alpha_2 L_2 - \alpha_1 L_1)/L_3 = 10.8 \times 10^{-6}$$

If aluminum is chosen as the material of the compensating member 22 and stainless steel as the material of the compensating member 21, we get the result $$24 L_2/L_3 - 16 L_1/L_3 = 10.8$$

Taking the filter length to be 1 cm (i.e. $L_3 = 1$), and the fact that $L_1 = L_2 + L_3$, the lengths $L_2 = 3.7$ cm and $L_1 = 4.7$ cm will give a null in the wavelength change with ambient temperature change.

The spring contacts 31, instead of being integral with the compensating member 21, could be constituted by discrete springs separate from and interposed between the compensating members 21 and 22 at the reference plane. Furthermore, some other preloading or adjusting arrangement, such as an electrically driven piezoelectric or magnetodistortive device placed between the compensating members 21 and 22 could be used instead of the above described spring loaded mechanical adjusting screw arrangement 30 and 31 to adjust the preloaded tension on the fiber portion 17 and give a final adjustment to the filter frequency. One could also use the mechanical or electrical frequency adjust to scan or sweep the filter frequency over a small frequency range without the problem of ambient temperature affecting the result. Also, the compensating members 21 and 22 could be cylindrical, in which case they would be provided with internal passages for the passage of the optical fiber 10 therethrough.

Figure 4:
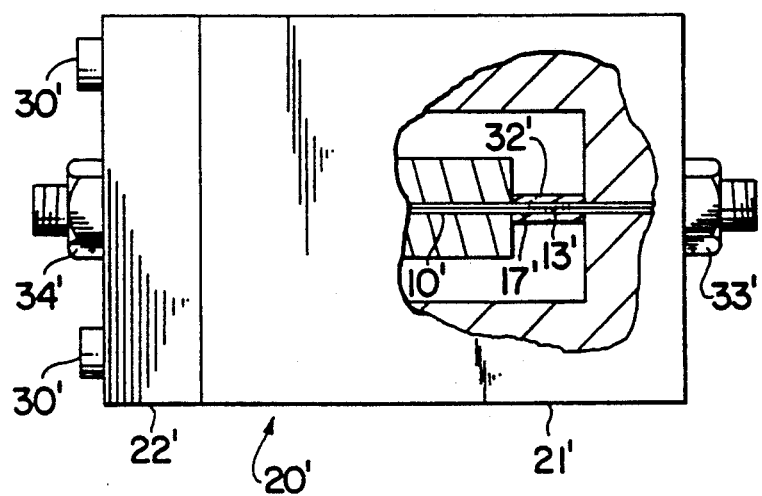
FIG. 4 is a view similar to that of FIG. 3 but showing a modified construction of the device in which the fiber is subjected to compressive rather than tensile stresses.

In FIG. 4, in which the same reference numerals as before but supplemented with a prime have been used to denote corresponding parts, the compensating or preloading device 20' is constructed to place the fiber portion 17' containing the grating 13' under compression. Here, the Bragg filter portion 17' is confined in the interior of, and advantageously is bonded along its length to the inside of, a small tube 32' made of, for instance, silica. The tube 32' is placed between the compensating members 21' and 22' that are made of two different materials, so that compressive stresses are applied to the filter region 13', wherein such stresses increase when the temperature increases and are relieved when the temperature decreases. In a similar fashion to the previously discussed construction, the filter region 13' is advantageously preloaded, this time in compression, to handle both positive and negative ambient temperature changes. Preloading, accomplished in the same manner as described in conjunction with the first embodiment, could also be used to tune, scan, or adjust the frequency of the filter region 13'. The temperature compensation rate would be set by choosing materials with the appropriate expansion coefficients for the compensating members 21' and 22' and the inside and outside diameters of the silica tube 32' to which the fiber portion 17' may be bonded.

For symmetrical mechanical support and loading, the compensating members 21 and 22, or 21' and 22' could be made cylindrical. Then, in the preloading device 20' of FIG. 4, the silica tube 32' containing bonded fiber portion 17' preferably lies along the center line of the device 20'. In both instances, the fiber 10 or 10' provided with the Bragg filter grating 13 or 13' enters and exits through respective holes situated in the centers of the cylindrical preloading members 21 and 22 or 21' and 22'. For packaging, fiber optic connectors 33' and 34' could be placed on the ends of the cylindrical compensator 20' (or 20), making it an independent device that can be assembled with other components of an optical system.

The thermally compensated optical filter arrangements of the present invention are capable of a wide variety of uses in the optical field. Thus, for instance, they could be used as wavelength standards, and in stabilizing the emission frequency of laser diodes used as light sources or as local oscillators for coherent communications or multiplexed data links. Such filter arrangements could also be used in fiber optic sensor systems to measure changes in sensor signals or for sensor stabilized emission sources.

While the present invention has been illustrated and described as embodied in particular constructions of a temperature compensated Bragg filter device, it will be appreciated that the present invention is not limited to these particular examples; rather, the scope of protection of the present invention is to be determined solely from the attached claims.

We claim:

1. A temperature compensated embedded grating optical waveguide light filtering device comprising
    an optical waveguide including an elongated core having two longitudinally spaced end portions, and means for guiding light in an elongated path along a longitudinal axis of said core, said core including a portion of a predetermined limited length at a location remote from said end portions and having embedded therein a multitude of grating elements extending with a substantially equal longitudinal spacing substantially normal to said longitudinal axis and collectively constituting a grating that reflects, of the light propagating in said path toward and reaching said grating elements, that of a wavelength within a range about a central wavelength determined by said spacing of said grating elements and by the index of refraction of the material of said core as influenced by the temperature of and longitudinal strains applied to said grating, back into said path for longitudinal propagation therein opposite to the original propagation direction; and
    means for applying to said optical waveguide longitudinal strains the magnitude of which varies with temperature in such a manner that the changes in said central wavelength that are attributable to the changes in said longitudinal strains substantially compensate for those attributable to the changes in the temperature of said grating.

2. The light filtering device as defined in claim 1, wherein said applying means includes two compensating members each attached to said optical waveguide at a different longitudinal location such that said core portion is situated between said locations, and connected to one another at a connecting region that is at least axially spaced from said locations, said compensating members being of materials exhibiting thermal expansion coefficients that differ from one another to such an extent that thermally induced longitudinal strains applied to said core portion as a result of differential axial thermal expansion between those portions of said compensating members that are disposed between said connecting region and that of said locations at which the respective one of said compensating member is attached to said optical waveguide have said magnitude.

3. The light filtering device as defined in claim 2, wherein said applying means further comprises means for adjustably connecting said compensating members to one another at said connecting region in such a manner as to be able to selectively vary the longitudinal distance between said locations and thus the longitudinal strains applied to said core portion independently of said thermally induced longitudinal strains.

* * * * *